J. A. JOHNSON.
HAY LOADER.
APPLICATION FILED APR. 28, 1909.
947,018.
Patented Jan. 18, 1910.
3 SHEETS—SHEET 1.
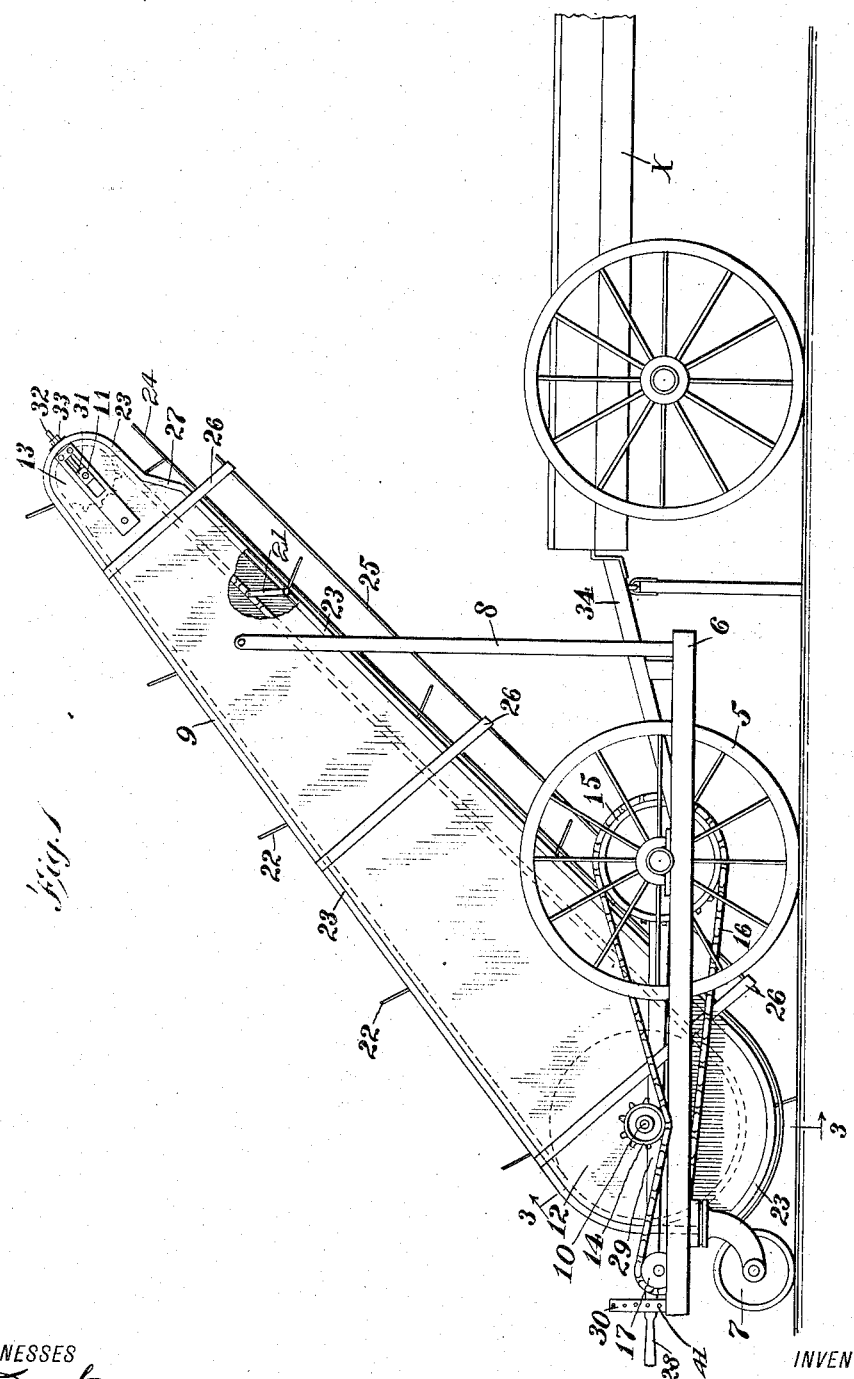
WITNESSES
INVENTOR
John August Johnson
ATTORNEYS

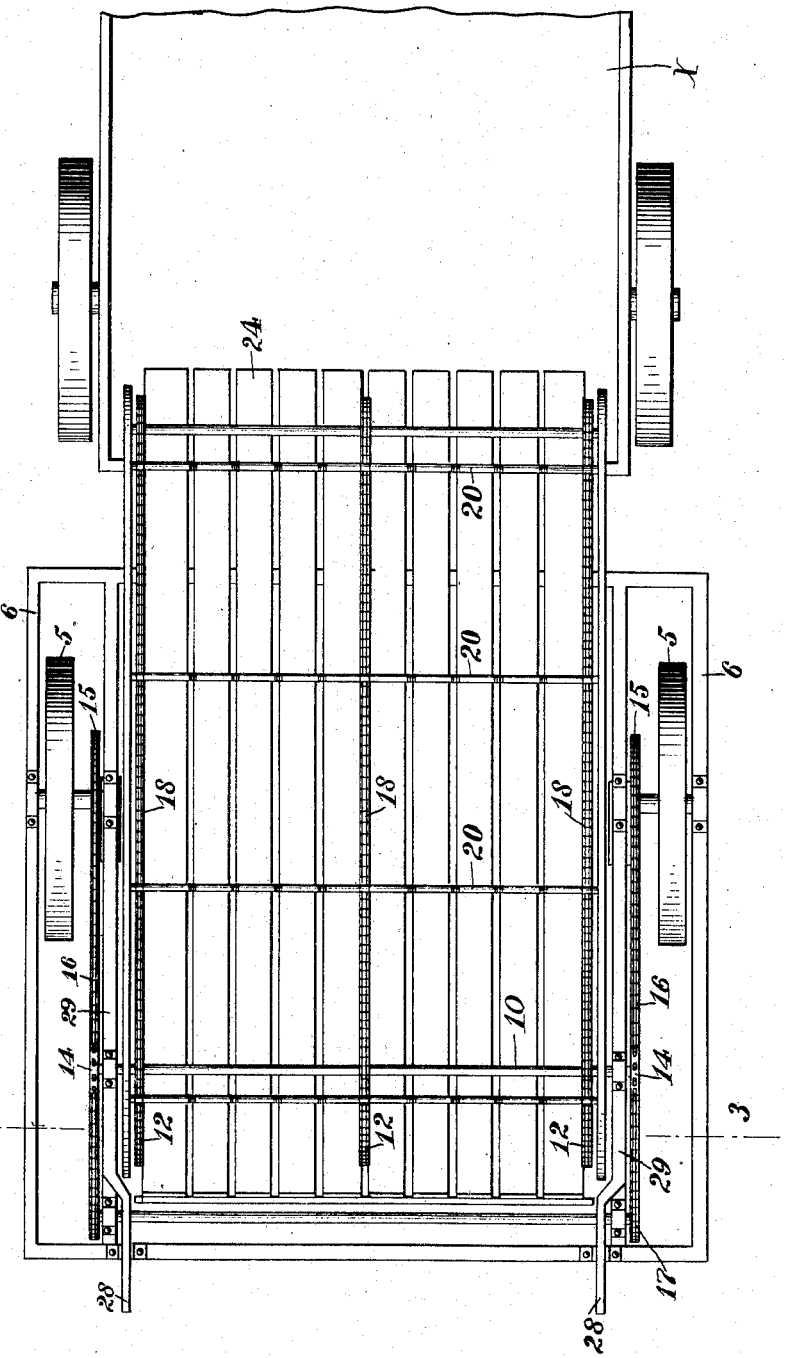

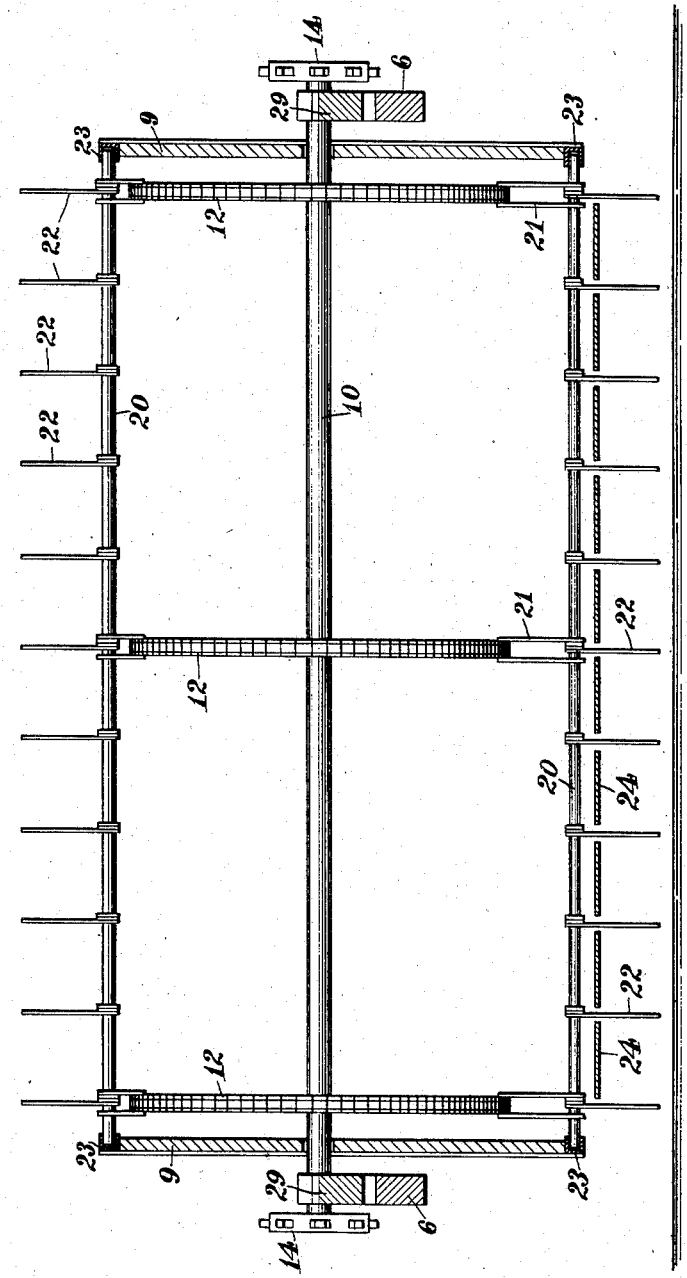
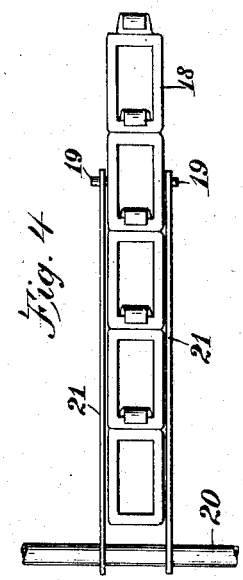

UNITED STATES PATENT OFFICE.

JOHN AUGUST JOHNSON, OF WASCO, ILLINOIS.

HAY-LOADER.

947,018.  Specification of Letters Patent.  Patented Jan. 18, 1910.

Application filed April 28, 1909. Serial No. 492,620.

*To all whom it may concern:*

Be it known that I, JOHN AUGUST JOHNSON, a citizen of the United States, and resident of Wasco, in the county of Kane and State of Illinois, have invented a certain new and useful Hay-Loader, of which the following is a full, clear, and exact description.

Among the principal objects which the present invention has in view are: to provide a mechanism which in operation carries the hay from the ground to an elevated point, and deposits the same into a suitable vehicle; to provide a mechanism wherein the elevation of the material being handled is conducted so that the tailings are not carried over and deposited between the vehicle being loaded and the loader; and to provide a mechanism for the accomplishment of the above-mentioned objects which is simple and durable in construction and efficient in operation.

One embodiment of the present invention is illustrated in the accompanying drawings wherein like characters of reference indicate corresponding parts in all the views.

Figure 1 is a side elevation of a hay loader constructed in conformity with my invention and shown in conjunction with a vehicle to be loaded; Fig. 2 is a plan view of the construction shown in Fig. 1; Fig. 3 is a cross sectional view of the lower end of the elevator, taken on the lines 3—3 in Figs. 1 and 2 and Fig. 4 is a top view of the driving chain constructed in conformity with my invention and utilized therein, this view also showing the elevator bar employed.

The particular use for which the present invention is designed is as a loader for hay or like substances, the loading being into a wagon such as shown in the drawings.

The loader is mounted upon wheels 5, 5, and is provided with frame side bars 6 on which the axle for the said wheels is mounted in suitable bearings. The rear end of the loader frame is provided with caster wheels 7, (one of which is shown in Fig. 1) by means of which the wheels 5 may track freely in any direction following after the vehicle X. The frame for carrying the loader and the wheels mentioned, is of any suitable construction and is provided with upright carrying members 8, 8, being secured to side frames 9, 9. Between the frames 9, 9, are mounted suitable braces for maintaining the said frames in line, and also shafts 10 and 11, on which are carried sprocket wheels 12 and 13 respectively. On the shaft 10 are likewise secured small driving sprocket wheels 14 located beyond the side pieces 9, and in line with sprocket wheels 15 secured rigidly upon the wheels 5. Sprocket chains 16 extend around the sprocket wheels 15 and under and in toothed engagement with the sprocket wheels 14, and at the rear end of the frame of the loader the sprocket chains are extended over and around small idlers 17. When the wheels 15 and 14 are thus engaged by means of the chains 16, it will be observed that as the loader is moved forward there is imparted to the shaft 10 and to the wheels 12 mounted thereon a rotary action, and that the chains 16 by passing under the sprocket wheels 14 impart a rotary movement, to move the wheels 12 in the forward direction at the lower portion thereof.

There may be any desired number of the wheels 12, and they are connected with a like number of wheels 13 at the upper end of the frame, by endless link belts 18. Any motion imparted, therefore, to the wheels 12 is likewise imparted to the wheels 13. The chains 18 are constructed as shown in Fig. 4 of the drawings, consisting of connected metal links, and at suitable intervals a link is introduced which is provided with side extensions 19, 19, to which bars 20, 20, are connected by means of connecting links 21, 21. The bars 20 are provided with a series of spring metal rake tines 22.

The construction wherein the rake tines 22 are mounted on the bars 20, results in a plurality of rake-like members disposed at suitable intervals to travel up the incline of the elevator. The ends of the bars 20 will extend into the channels of small grooved edges 23, 23, which are secured upon the side pieces 9, the grooved edges 23 being bent to form a path for the travel of the bars 20 and to constitute the edges of the side pieces 9.

The lower side of the elevator is composed of a series of parallel wood or metal strips 24, 24, suitably supported at the lower and upper end of the frame, to avoid the bars 20 which pass up the incline formed by the same. The width of the strips 24, 24, is dictated by experience, being of any width desired. The strips are separated each from the other to provide a parallel groove or slot through which extend the tines 22 mounted upon the bars 20. By the strips 24 any hay or similar material being moved up the inclined platform 25 is prevented from rising up the tines 22 and escaping over the bars 20 to avoid being elevated thereby. The platform 25 is secured to the side pieces 9 by extension strips 26, 26.

The strips 24 are extended to the shape of the edge of the side pieces 9 at the lower end thereof, and extended beyond an angular extension 27 which is provided at the upper end. The angular extension of the grooved edges 23 is sufficiently removed at the upper end from the strips 24, so that the effect is to retract the tines 22 perpendicularly from the slots formed by the members 24 at this point. This action is to clear the tines of any adhering wisps of straw or similar material.

While I have herein shown the loader as having a driving connection with the vehicle wheels 5, I wish it understood that I may discontinue the use of this particular form of construction and substitute therefor any known and approved method of rotating the shaft 10.

In order to facilitate the handling of the feeder, I have provided handles 28, whereby the frame may be guided. The handles 28 are formed on the end of carrying beams 29, on which are mounted the sprocket wheels 14 and the idler 17, said beams being pivotally connected to the axle on which are mounted the wheels 5, 5. On the main frame of the machine are mounted upright rack sides 30, provided with suitable perforations 41 for the passage of a bolt. When now it is desired to raise the lower end of the elevator, as when it is desired to lift the ends of the tines farther from the surface of the ground or to lower the same so as to come closer to the surface of the ground, the bolt mentioned is removed from the said perforations and the handles 28 are raised or lowered as desired and the bolt readjusted to hold the parts in the new position.

The shaft 11 on which the sprocket wheels 13, 13, are carried, is mounted in a movable bearing box 31, which is engaged by a draw bolt 32 held in position by a screw nut 33. By screwing up the nut 33, the bolt 32 may be drawn to carry the bearings 31 toward the end of the elevator and thereby take up any slack which may have occurred in the chains 18.

Having a hay loader constructed as shown in the drawings and as above described, the operation of the same is as follows: The vehicle X which it is desired to load is secured by means of a draw beam 34 to the loader at the rear end of the vehicle, and the upper and elevated end of the loader is adjusted as nearly as possible to the desired arrangement with reference to the said vehicle. This is effected by raising or lowering the standards 8, 8, and by raising and lowering the rear ends of the beams 29, 29. This adjustment having been arranged for, the vehicle is drawn by the team across the field in which the hay has been cut. As the tines 22 pass around the sprocket wheels 12, 12, and enter between the strips 24, 24, they are brought in close proximity to the surface of the ground, raking the hay therefrom and carrying it onto the lower end of the platform 25. As the tine which has the wisps of hay in advance of those on the platform 25 ascends the same, the hay is carried up the same in advance. Beyond the upper end of the platform 25 the bars 20 are caused to follow the incline 27 formed in the grooved edges 23 which operates to retract the tines through the slots formed between the strips 24, 24, at the upper end thereof. As stated, this action of retracting the tines clears the same of any adhering wisps of straw.

When the vehicle is loaded, it is disconnected and starts away on its delivery trip, and a succeeding vehicle takes its place, being attached to the loader, and the operation above described is repeated, succeeding vehicles being successively attached to the loader which operates as above described.

It will be observed that all the hay which is handled by the loader is carried up the platform underneath the loader, and that the tines of the loading device are stripped of any adhering material, whereby all material in advance of the lower end of the loader where the tines are brought in close proximity to the surface of the ground, will be compelled to ascend the platform 25 and to be delivered therefrom into the vehicle.

Having thus described my invention, I claim as new and desire to secure by Letters Patent:

1. A hay loader, comprising a plurality of rake-like members, having laterally-extended bars connected by endless driving belts, side frames having slots formed in the edge thereof for governing the position of said rake-like members, said slots having an upwardly inclined portion at the delivery end of said loader to raise the said members from contact with the material being handled, stripping devices embodying slats longitudinally disposed, between which the rake-like members extend, said stripping devices extending beyond the platform over which the material being handled is conveyed by the said rake-like members, a platform mounted on said loader parallel with the lower extension of said slots and adapted to extend over the end of the wagon to which said loader is attached, and a suitable driving mechanism for said endless belt adapted to move the said rake-like members up the said platform.

2. A hay loader, comprising a plurality of rake-like members having laterally extended bars connected by endless driving belts, side frames having slots formed in the edge thereof for governing the position of said rake-like members, said slots having an upwardly inclined portion at the delivery end of said loader to raise the said members from contact with the material being handled, stripping devices embodying slats longitudinally disposed, between which the rake-like members extend, said stripping devices extending beyond the platform over which the material being handled is conveyed by the said rake-like members, a platform mounted on said loader parallel with the lower extension of said slots and adapted to extend over the end of the wagon to which said loader is attached, and a driving mechanism for said rake-like members embodying endless belts and sprocket wheels fixedly mounted upon a driving shaft and adapted to be operated by the traction wheels of the loader and pulleys located at the upper end of the loader adapted to carry the said endless belts and having adjustable boxes whereby the slack in the said belts may be taken up.

In testimony whereof I have signed my name to this specification in the presence of two subscribing witnesses.

JOHN AUGUST JOHNSON.

Witnesses:
   Geo. Berglund,
   Elmer T. Peterson.